Patented Feb. 25, 1930

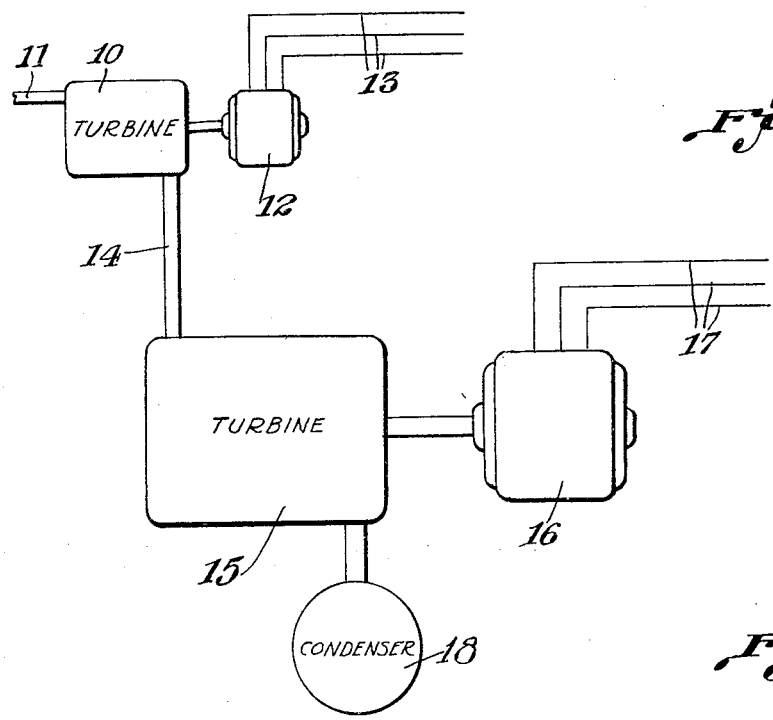
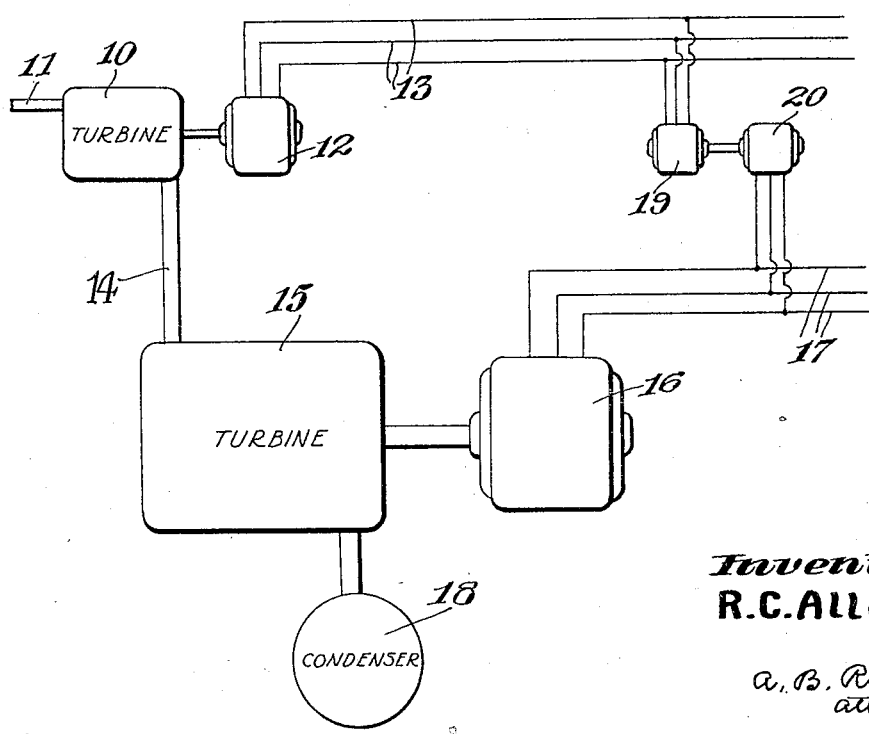

1,748,097

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

DYNAMO-ELECTRIC POWER PLANT

Application filed February 6, 1929. Serial No. 337,872.

My invention relates to a prime mover and generator installation and it has for an object to provide an arrangement of a pair of turbines operating at suitable speeds and utilizing a wide range of expansion of steam together with generators operating at different frequencies to carry suitable loads.

The need frequently arises for turbine generator units which shall be capable of generating 25-cycle current for railway load, and this does not permit a greater rotative speed than 1500 R. P. M. When high steam pressure, for example, 1200 lbs. per sq. inch, is used, a 1500 R. P. M. turbine is uneconomical on account of the greater windage and leakage losses. A turbine utilizing steam at high pressure should be of the high-speed type so that its size, as well as the ratio of leakage area to quantity of steam passing, may be reduced. It is usual for railways to also have a considerable demand for current of a higher frequency, for example, 60-cycle. For a 60-cycle generator, with the turbine connected directly thereto, the highest possible speed is 3600 R. P. M.; however, this speed is more than twice as great as that which may be had with a 25-cycle unit and it may be advantageously employed as a first unit in a system, that is, steam at high pressure would be supplied to the 60-cycle 3600 R. P. M. unit and would be exhausted therefrom to the 25-cycle 1500 R. P. M. unit. In this way, the units are most advantageously employed considering the pressures of steam dealt with and greater overall efficiency for the high pressure range of the steam expansion may be secured. A more particular object of my invention is, therefore, to provide a generating system capable of generating current at a high frequency and at a low frequency together with prime movers for the generators operated by steam received at high initial pressure, the turbine receiving steam at high pressure operating at a higher speed, that is, being connected to the generator of higher frequency so that current at the two frequencies may be generated in a single installation and the installation may be operated economically over a high pressure range of expansion.

Heretofore, where it was desired to supply current of different frequencies, it was necessary either to provide separate prime movers and generators or to provide, in connection with a single generator, frequency changing apparatus. If frequency changers could be eliminated, the system would be more efficient, at least to the extent of losses attributable to a frequency changer. While separate systems, each having its own prime mover, might give greater efficiency, there would be the expense of the separate prime mover. Not only do I generate current at two frequencies in a single installation, thereby avoiding the loss incident to frequency changing apparatus, but I avoid separate and independent prime movers and I secure the advantage of greater economy by having the turbine of higher permissible speed first abstract energy from the high-pressure steam. For example, I may have a 3600 R. P. M. turbine supplied with steam at 1200 lbs. pressure and driving a generator supplying a 60-cycle system and a 1500 R. P. M. turbine supplied with steam at or about 300 lbs. pressure and exhausted from the high pressure turbine, the latter turbine driving a generator for a 25-cycle system. A system of this character is particularly desirable for railway work, for more power, that is, power for traction, would be generated at the lower frequency; however, with a railway installation, there is a considerable demand for power other than for traction purposes and this demand is adequately taken care of by the high-pressure turbine and its generator. If one system should tend to become overloaded while the other is lightly loaded, power may be with advantage supplied from the lightly loaded system to the heavily loaded system; and, to this end, frequency changer apparatus may be floatingly arranged between the two systems.

These and other objects are accomplished by my invention as will be apparent from the following description and claims taken in connection with the accompanying drawings, forming a part of this application, in which:

Fig. 1 is a diagrammatic view of my improved power plant installation; and,

Fig. 2 is a view showing a modified form incorporating frequency changer apparatus.

In Fig. 1, I show a turbine 10 supplied with steam through the inlet 11 from any suitable source. The steam so supplied is preferably at a high pressure, for example, of the order of 1200 lbs.; and the turbine 10 is preferably arranged to operate at a high speed, for example, 3600 R. P. M. in order to drive the two-pole generator 12 to supply the system 13 with 60-cycle current.

Steam exhausting from the turbine 10 through the exhaust conduit 14 is admitted to the turbine 15, which is preferably of the ordinary or moderate pressure type. For example, the turbine 15 may have steam admitted thereto at 300 lbs. pressure. The turbine 15 preferably operates at a speed of 1500 R. P. M. and it drives a two-pole generator 16 supplying the system 17 with 25 cycle current. The exhaust from the turbine 15 goes to a suitable condenser 18.

The greater portion of the heat energy converted into mechanical work and then into electrical energy by the above system will take place in the turbine 15. This is as it should be with a railway system where the connected generator 16 supplies power for traction purposes. On the other hand, with the usual railway system, there is a considerable demand for 60-cycle current; and, with the present system, this demand may be very efficiently taken care of by having it supplied by a high-pressure turbine, that is, the 60-cycle demand is taken care of by the same motive fluid which takes care of the 25-cycle traction demand, it being merely necessary that the motive fluid be generated at a sufficiently high pressure to take care of both of these demands in an efficient manner. Furthermore, as the 60-cycle unit may be operated at a much higher speed than the 25-cycle unit, it is more economical to admit the high pressure steam to the 60-cycle unit, thereby minimizing windage and leakage losses. Stated in another way, the foregoing system is capable of carrying the 60-cycle load with only a slightly increased fuel cost over that which would ordinarily be required for supplying the moderate pressure turbine.

In Fig. 2, I show an installation which is the same as that already described except that frequency changer apparatus is arranged between the 60-cycle system 13 and the 25-cycle system 17. Such frequency changer apparatus may be of any suitable type and it is only diagrammatically indicated in Fig. 2. I show an element 19 connected to the system 13 and an element 20 connected to the system 17. These elements 19 and 20 are connected together and serve to transfer power from one system to the other. For example, assuming that the 60-cycle system should be overloaded, then the element 20 would be operated as a synchronous motor from the system 17 to drive the element 19 as a generator to supply 60-cycle current to the system 13. If the system 17 should be overloaded, then the element 19 would operate as a motor to drive the element 20 as a generator to supply 25-cycle current to the system 17.

From the foregoing, it will be apparent that I have provided a power plant installation which is very efficient in meeting the demands for electric power at different frequencies and particularly where there is a much greater demand for power of a low frequency than for power of a higher frequency. For example, in railway work, the major demand for power is for traction purposes; however, there is a considerable demand for power for lighting, etc. This demand for 60-cycle current may be very well taken care of by having it carried by a high-pressure turbine which expands steam from the high pressure to a moderate pressure, the further expansion of steam from the moderate pressure to vacuum being adequate to take care of the traction load.

It will furthermore be seen that I have used an inherent capability of the 60-cycle unit in an advantageous way, that is, the permissible much higher speed thereof, when compared to a 25-cycle unit, makes possible more economical generation of electrical energy at the two different frequencies, as steam at very high pressure may be admitted to the turbine of higher speed, thereby securing greater economy than if the turbine operated at a lower speed, and the turbine of lower speed may be operated by steam exhausting from the first turbine.

While I have shown my invention in several forms, it will be obvious to those skilled in the art that it is not so limited, but is susceptible of various other changes and modification, without departing from the spirit thereof, and I desire, therefore, that only such limitations shall be placed thereupon as are imposed by the prior art or as are specifically set forth in the appended claims.

What I claim is:

1. In a prime mover and generator installation, the combination of a high-speed and high-pressure turbine, a turbine of lower speed operated by steam of moderate pressure exhausted from the high-pressure turbine, and generators of different frequencies connected to the turbines, the generator of higher frequency being connected to the high-pressure and high-speed turbine.

2. In a prime mover and generator installation for a railway system requiring power at a low frequency for traction purposes and requiring power at a higher frequency for other purposes, the combination of a high-speed and high-pressure turbine, a turbine of lower speed operated by steam of moderate pressure exhausted from the high pressure turbine, a generator connected to the last-named turbine and supplying a low frequency current for carrying the traction load, and a generator of higher frequency connected to the high-pressure and high-speed turbine for carrying load other than traction load.

3. In a prime mover and generator installation, the combination of a first turbine having a normal speed of 3600 R. P. M. and operated by steam received at a pressure of the order of 1200 lbs. and exhausted therefrom at a pressure of the order of 300 lbs., a generator having a single pair of poles and driven by said turbine, a second turbine of lower speed operated by steam exhausted from the first turbine and a generator of lower frequency than the first generator and driven by said second turbine.

4. In a prime mover and generator installation, the combination of a first turbine having a normal speed of 3600 R. P. M. and operated by steam received at a pressure of the order of 1200 lbs. and exhausted therefrom at the order of 300 lbs., a generator having a single pair of poles and driven by said turbine, a second turbine having a normal speed of 1500 R. P. M. operated by steam exhausted from the first turbine, and a two-pole 25-cycle generator driven by the second turbine.

5. In a prime mover and generator installation, the combination of a first turbine having a normal speed of 3600 R. P. M. and operated by steam received at a pressure at the order of 1200 lbs. and exhausted therefrom at the order of 300 lbs., a generator having a single pair of poles and driven by said turbine, a second turbine having a normal speed of 1500 R. P. M. operated by steam exhausted from the first turbine, a two-pole 25 cycle generator driven by the second turbine, power systems supplied by the generators, and frequency changer apparatus for interconnecting the systems.

In testimony whereof, I have hereunto subscribed my name this 28th day of January, 1929.

ROBERT C. ALLEN.